United States Patent
Balasubramanian

(10) Patent No.: US 11,886,737 B2
(45) Date of Patent: Jan. 30, 2024

(54) DEVICES AND SYSTEMS FOR IN-MEMORY PROCESSING DETERMINED

(71) Applicant: Infineon Technologies AG, Neubiberg (DE)

(72) Inventor: Prakash Balasubramanian, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 17 days.

(21) Appl. No.: 17/537,665

(22) Filed: Nov. 30, 2021

(65) Prior Publication Data

US 2022/0188023 A1    Jun. 16, 2022

(30) Foreign Application Priority Data

Dec. 15, 2020    (DE) .................... 10 2020 133 585.7

(51) Int. Cl.
*G06F 3/06*    (2006.01)
(52) U.S. Cl.
CPC ............ *G06F 3/0658* (2013.01); *G06F 3/061* (2013.01); *G06F 3/0673* (2013.01)
(58) Field of Classification Search
CPC ....... G06F 3/0658; G06F 3/061; G06F 3/0673
USPC ........................................................ 711/154
See application file for complete search history.

(56) References Cited

U.S. PATENT DOCUMENTS

| | | | |
|---|---|---|---|
| 2019/0205273 A1* | 7/2019 | Kavalieros | H03K 19/215 |
| 2020/0292971 A1* | 9/2020 | Iijima | G03G 15/6564 |
| 2020/0293105 A1* | 9/2020 | Ambardekar | G06F 1/3275 |
| 2020/0293208 A1* | 9/2020 | Yang | G06F 3/0634 |
| 2020/0293868 A1* | 9/2020 | Mital | G06N 3/08 |
| 2021/0042045 A1* | 2/2021 | Tatara | G06F 3/0653 |
| 2021/0073621 A1* | 3/2021 | Seo | G11C 16/26 |
| 2021/0109668 A1* | 4/2021 | Kale | G06F 3/0659 |
| 2022/0012303 A1* | 1/2022 | Zheng | G06F 17/16 |

OTHER PUBLICATIONS

Slogsnat, David Christoph; "Tightly-Coupled and Fault-Tolerant Communication in Parallel Systems"; Mannheim; 2008.
Wikipedia; "Central Processing Unit" Dec. 14, 2020.
Huggahalli, Ram et al; "Direct Cache Access for High Bandwidth Network I/O"; 32nd International Symposium on Computer Architecture (ISCA'05); Jun. 2005.
Wikipedia; "CPU Cache"; Dec. 8, 2020.
Wikipedia; "Heterogeneous Computing"; Dec. 3, 2020.

* cited by examiner

*Primary Examiner* — Christopher B Shin
(74) *Attorney, Agent, or Firm* — Eschweiler & Potashnik, LLC

(57) ABSTRACT

A memory device can include a plurality of memory cells for storing data, a memory interface configured to store and retrieve data at the plurality of memory cells, a logic unit comprising digital circuitry configured to perform mathematic and logic operations, and a control circuitry configured to control operation of the memory device.

19 Claims, 7 Drawing Sheets

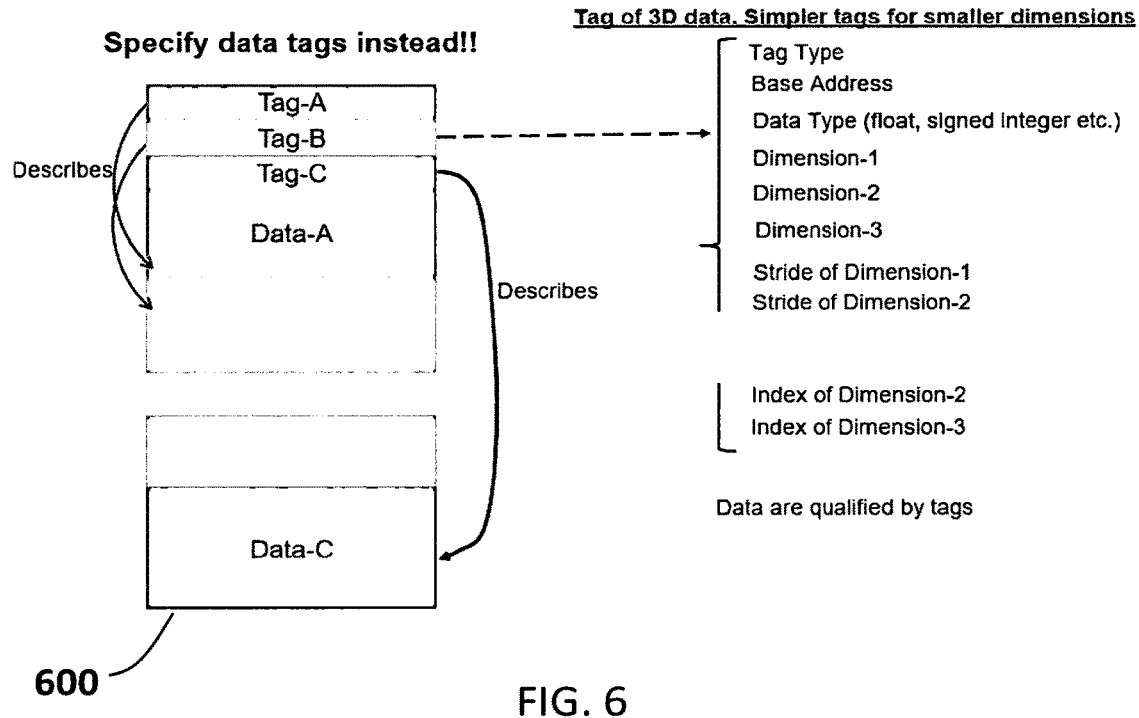

FIG. 6

| Scalar data | 1D data | 2D data | 3D data |
|---|---|---|---|
| Tag Type | Tag Type | Tag Type | Tag Type |
| Base Address | Base Address | Base Address | Base Address |
| Data Type (float, integer etc.) | Data Type | Data Type | Data Type |
| | Dimension-1 | Dimension-1 | Dimension-1 |
| | Stride of Dimension-1 | Dimension-2 | Dimension-2 |
| | Index of Dimension-1 | Stride of Dimension-1 | Dimension-3 |
| | | Stride of Dimension-2 | Stride of Dimension-1 |
| | | Index of Dimension-1 | Stride of Dimension-2 |
| | | Index of Dimension-2 | Stride of Dimension-3 |
| | | | Index of Dimension-1 |
| | | | Index of Dimension-2 |
| | | | Index of Dimension-3 |

FIG. 7

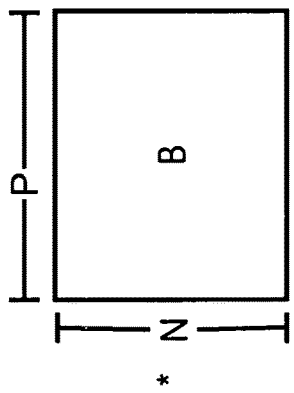
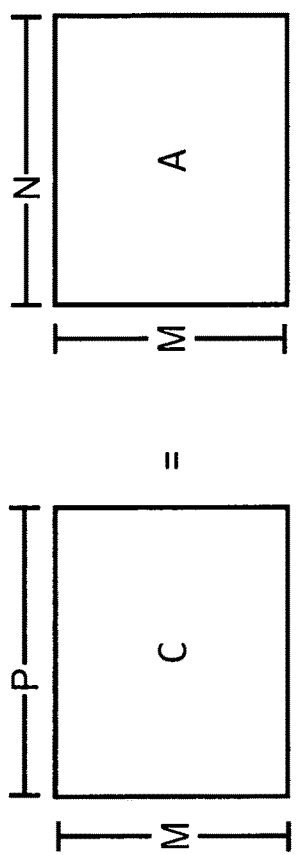
FIG. 9

DEVICES AND SYSTEMS FOR IN-MEMORY PROCESSING DETERMINED

REFERENCE TO RELATED APPLICATION

This application claims priority to German Application No. 10 2020 133 585.7, filed on Dec. 15, 2020, the contents of which are hereby incorporated by reference in their entirety.

TECHNICAL FIELD

Various embodiments generally relate to memory devices.

BACKGROUND

In Von-Neumann computer architecture systems, data is stored in memory, and all computations concerning the data are performed on a Central Processing Unit (CPU). Thus, the Von-Neumann computer architecture requires data to be moved from memory to CPU and later back to the former after necessary computations. However, this sort of system is reaching its performance limits. The movement of data from memory to CPU and back requires a lot of time (bandwidth) and energy.

Advances in Von-Neumann architecture have resulted in in-processor features pertaining to Instruction-level parallelism (ILP) (e.g., Pipelined processors, VLIW, Super-scalars, etc.), Data-Level Parallelism (DLP) (e.g., SIMD), Thread-level parallelism (TLP) (e.g., Single Instruction Multiple Threads (SIMT) Graphics Processing Units (GPUs)), Graph Level Parallelism, Cache architectures, Multi-Cores, etc. The latencies associated with data movement are attempted to be hidden by several processor features leading to increasing complex architectures.

These such improvements have come at the cost of extra logic gates and power consumption and, therefore, leakage. These architectures are now experiencing declines in performance improvement, and thus future pay-offs of such approaches will likely reduce significantly in the future.

BRIEF DESCRIPTION OF THE DRAWINGS

In the drawings, like reference characters generally refer to the same parts throughout the different views. The drawings are not necessarily to scale; emphasis instead generally being placed upon illustrating the principles of various embodiments of the present disclosure. In the following description, various embodiments are described with reference to the following drawings, in which:

FIGS. 6-7 are illustrations of exemplary data tags in accordance with exemplary embodiments of the present disclosure.

FIG. 9 shows an illustration representing matrix multiplication and corresponding code in accordance with exemplary embodiments of the present disclosure.

DETAILED DESCRIPTION

Figure 1:
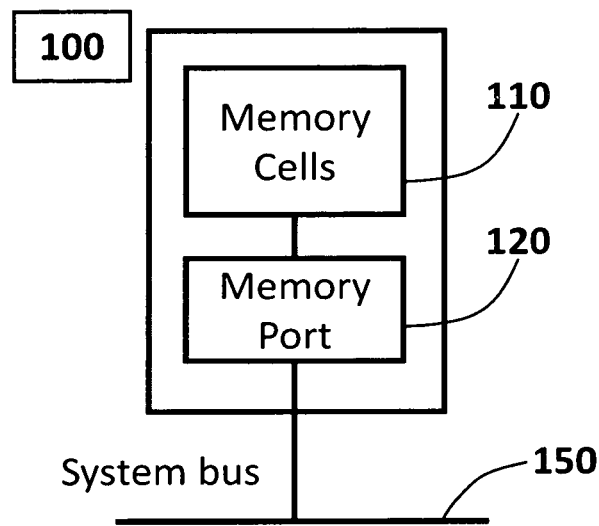
FIG. 1 is a block diagram of a memory device or system 100.

The following detailed description refers to the accompanying drawings that show, by way of illustration, specific details and embodiments may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [ . . . ], etc.).

As used herein, unless otherwise specified, the use of the ordinal adjectives "first", "second", "third" etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "controller" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computer Unit (NCU), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

As used herein, a signal that is "indicative of" a value or other information may be a digital or analog signal that encodes or otherwise communicates the value or other information in a manner that can be decoded by, and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure may be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments may be practiced.

FIG. 1 shows a block diagram of a memory device or system 100. The memory device 100 may include memory cells 110 and a memory port or interface 120 to access the memory cells 110 and exchange data between the memory device 100 and one or more devices. As shown, the memory device 100 may be coupled to a system bus 150. The memory port 120 can communicate with the other devices through the bus.

Figure 2:
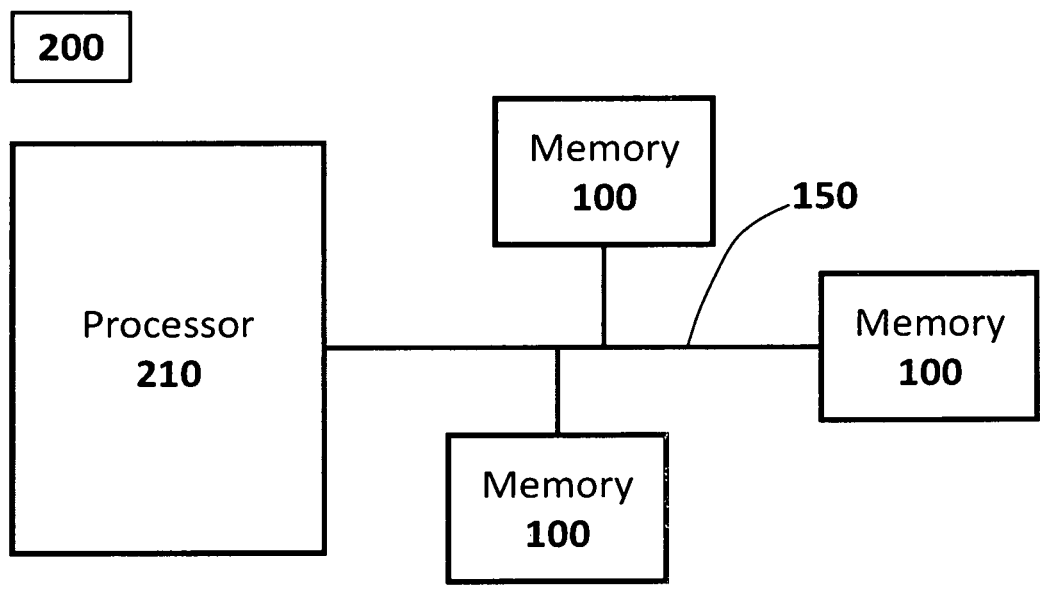
FIG. 2 is a block diagram of a computer architecture system.

The memory device 100 may be used in the conventional computer architecture system 200, as shown in FIG. 2. The system 200 includes a processor 210, (e.g., a central processing unit (CPU)). The processor 210 couples to other components, e.g., the memory devices 100, via the system bus 150. In the system 200, a sequence of stored instructions can be executed in an instruction sequence controlled by a program counter of the processor 210. The instructions may perform operations on data (for example, add and multiply instructions) or may read data to control the flow of the program among instructions (e.g., branch instructions). Each instruction is generally executable in sequence on a single integrated arithmetic logic unit. Computer architectures such as the system 200 can receive (a program of) instructions and initial data values for execution.

Improvement for architectures such as the system 200 tend to focus on processor or CPU improvements. However, the focus on CPU improvements has led to imbalanced systems. In some instances, processing is done only at one place, with other components (e.g., memory) used for only and retrieval of data. The improvements tend to be energy inefficient with low performance while leading to many complexities (e.g., bloated processor(s) with complex mechanisms).

Figure 3:
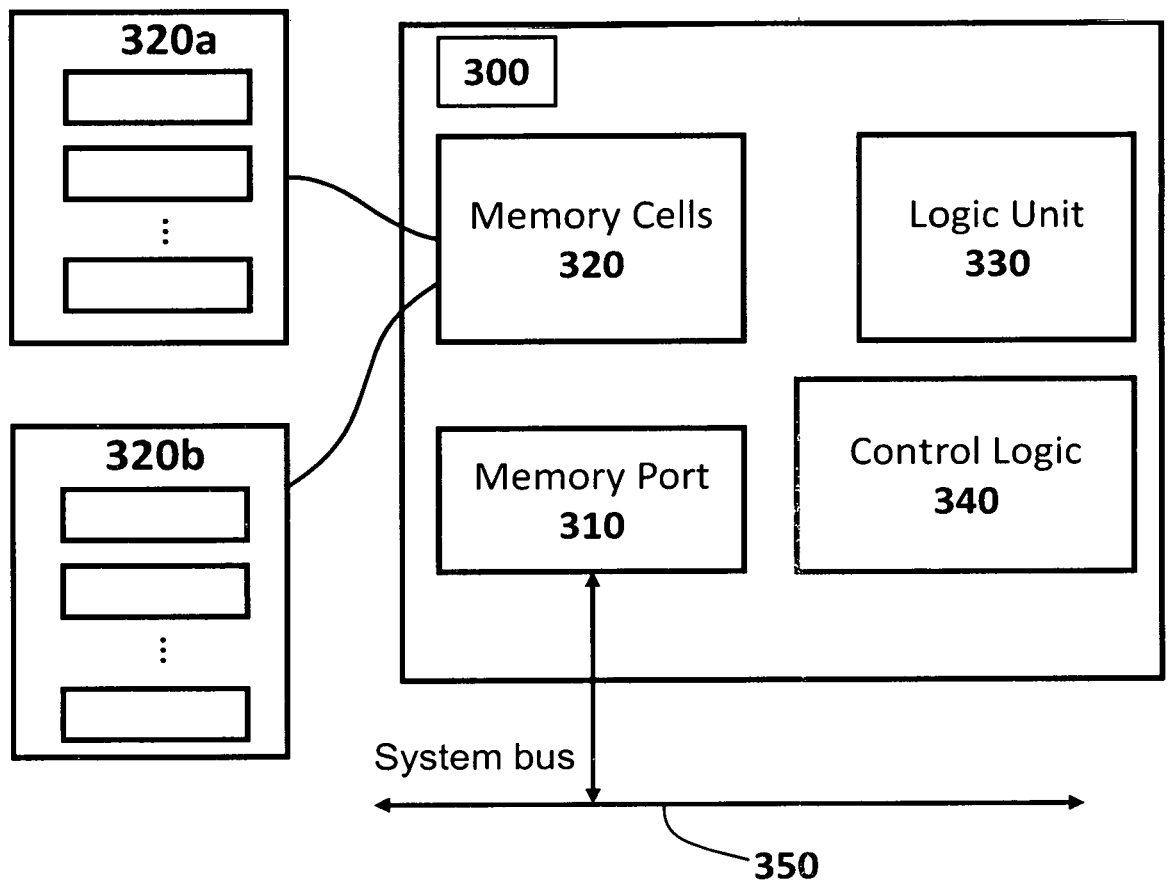
FIG. 3 is a block diagram of a memory device or system according to exemplary embodiments of the present disclosure.

FIG. 3 shows an exemplary memory device or system 300 that may be used for improved computer architectures. The memory device 300 may be considered as a processor-in-memory (PIM). As shown, the memory device 300 includes a memory port/interface 310, memory cells 320, a logic or processing unit 330, and a control logic circuitry 340. The memory device 300 components may be operatively connected to one another via any appropriate interfaces. Furthermore, it is appreciated that not all the connections between the components are explicitly shown, and other interfaces between components may be covered within the scope of this disclosure.

The memory device 300 is capable of and configured to integrate memory data storage functionality with computational (e.g., mathematical and/or logical operation) functionality. The memory port 310 can be an access port configured for communicating with other devices or components that are operatively coupled/connected to the memory device 300. The memory port 310 can be configured to access the memory cells, e.g., store data in and/or retrieve data from the memory cells 320.

The memory port 310 may be configured or enabled to directly access (e.g., directly store data in or retrieve data from) the memory cells 320. In some instances, the memory port 310 may operate according to, or under the control of, the control logic circuitry 340. That is, the memory port 310 may be commanded, instructed, or directed by the control logic circuitry 340 to communicate with other devices/components and/or to access the memory cells 320. The memory device 300 through the memory port 310 may be coupled to a system bus 350 connecting or coupling to one or more other devices or components. The memory port/interface 310 may be configured to use any suitable type of protocol or protocols for communications or interfacing with external components or devices, including, for example, standard interfaces such as Advanced eXtensible Interface (AXI), Wishbone, Shared Resource Interconnect (SRI), etc.

As shown in FIG. 3, the memory cells 320 of the memory device 300 may be considered or treated as two types or groups of memory cells, identified herein as processor memory cells 320a and legacy memory cells 320b. The processor memory cells 320a may be memory cells that can be accessed by the logic or processing unit 330. The processor memory cells 320a can store or include information such as data, code, etc. for use by the logic unit 330.

The logic unit 330 may be a processor or processing circuitry configured to execute instructions (e.g., code) and operate or perform computations using the information stored in the processor memory cells 320a. For processing, the logic unit 330 may, for example, exclusively access the processor memory cells 320a to retrieve and store data/information as necessary to perform one or more operations. The logic unit 330 may, for example, use data only from the processor memory cells 320a for performing operations (e.g., operations such as logic, mathematical, bitwise, etc.). The logic unit 330 may be, in some embodiments, an arithmetic logic unit (ALU) or the like.

As described, the memory cells 320 can also include legacy memory cells 320b that may operate as a traditional memory. the legacy memory cells 320b may be used as storage for other components (e.g., processors, devices, etc.) external to the memory device 300. Further, the legacy memory cells 320b may not store data for in-device processing, e.g., by the logic unit 330.

In various embodiments, the distinction or distribution of processor memory cells 320a and the legacy memory cells 320b may not be fixed or static. In other words, the memory cells 320 that are identified or assigned as processor memory cells 320a and the memory cells 320 that are identified or assigned as legacy memory cells 320b may vary depending on recognized circumstances or operation of the memory device. In some examples, the memory device 300, e.g., through the control logic circuitry 340, can be configured to assign some suitable or appropriate subset of the memory cells as the processor memory cells 320a and assign another or a different subset of the memory cells as the legacy memory cells 320b.

Further, in accordance with one or more exemplary embodiments of the present disclosure, the memory device 300 can be configured to function differently in different ways or modes.

For example, the memory device 300 may be configured to operate in a first mode associated with the operation or use of the logic unit 330. For example, when the memory device 300 is or operates in the first mode, the memory port 310 is configured to exchange communications with other electronic devices.

While or when the memory device is in the first mode, the memory port 310 can exchange communications related to or involving storage, retrieval, and/or the processing data in the processor memory cells 320a. The memory port 310 may obtain code or instructions for execution by the logic unit 330, and data to be operated on, or data resulting from operations by the logic unit 330. In the first mode, the logic unit 330 performs operations, e.g., processes or operates on data from the processor memory cells 320a.

In some exemplary embodiments of the present disclosure, the memory port 310 may also be configured to access the legacy memory cells 320b directly. That is, while in the first mode, the memory port 310, e.g., under control of the control logic circuitry 340, may generally access the processor memory cells 320a for in-processing related operations (e.g., by the logic unit 330) but may also be able to directly access (e.g., store and retrieve) the legacy memory cells 320b. The use or access of the legacy memory cells 320b may be in a conventional sense, and for in-device processing by the memory device 300.

The logic unit 330 may perform operations such as, for example scalar operation. Scalar operations that can be performed include but are not limited to arithmetic operations (e.g., addition, subtraction, multiplication, division, etc.), logical operations (e.g., AND, OR, XOR, NOT, etc.), dot product operations, vector/cross product, reduction operations, etc. Further, the logic unit 330, in the first mode, may be capable of performing Single Instruction, Multiple Data (SIMD) operations. As described herein, the logic unit 330 may, for example, only interface and perform operations using the processor memory cells 320a. The logic unit 330 may be any suitable type of circuitry for performing the above-mentioned type of operations, including, for example, an ALU.

In various embodiments, the control logic circuitry 340 may be configured to cause the logic unit 330 to perform one or more processing operations on data in the processor memory cells 320a.

The memory device 300 may also operate in a second mode. In the second mode, memory device 300 may be configured to operate a traditional memory. While the memory device 300 operates in the second mode, data may be directly stored or retrieved (e.g., via the memory port 310) from the legacy memory cells 320b. In some cases, the memory port 310 may, for example, only access (e.g., directly) data from the legacy memory cells 320b. In some other cases in the second mode, data may also be stored and retrieved (also via the memory port 310) in the processor memory cells 320a. However, in such instances, while the memory device 300 operates in the second mode, the ALU may not execute or perform operations, e.g., does not perform operations on data in the processor memory cells 320a.

In embodiments, the memory device may be triggered to operate in a particular mode, e.g., the first or second mode. In at least one example, the memory device 300 may be configured to operate in the first mode (e.g., where the ALU operates) in response to a (mode) control signal. This control signal may be received by the memory port 310. In some instances, the memory port 310 may include a specialized port for receiving such a control signal. In other instances, the control signal may be received via the same port(s) or interface(s) as other signals.

In addition, the memory port 310 may be capable of or configured to as a slave interface and may in other instances operate as a master or master port/interface. For example, the memory port 310 may be configured to operate a master, e.g., a bus master, and control at least one bus (e.g., bus 350) coupled to the memory port 310. The control logic circuitry 340 may be configured to cause the memory port 310 to operate as a slave or bus master.

Figure 4:
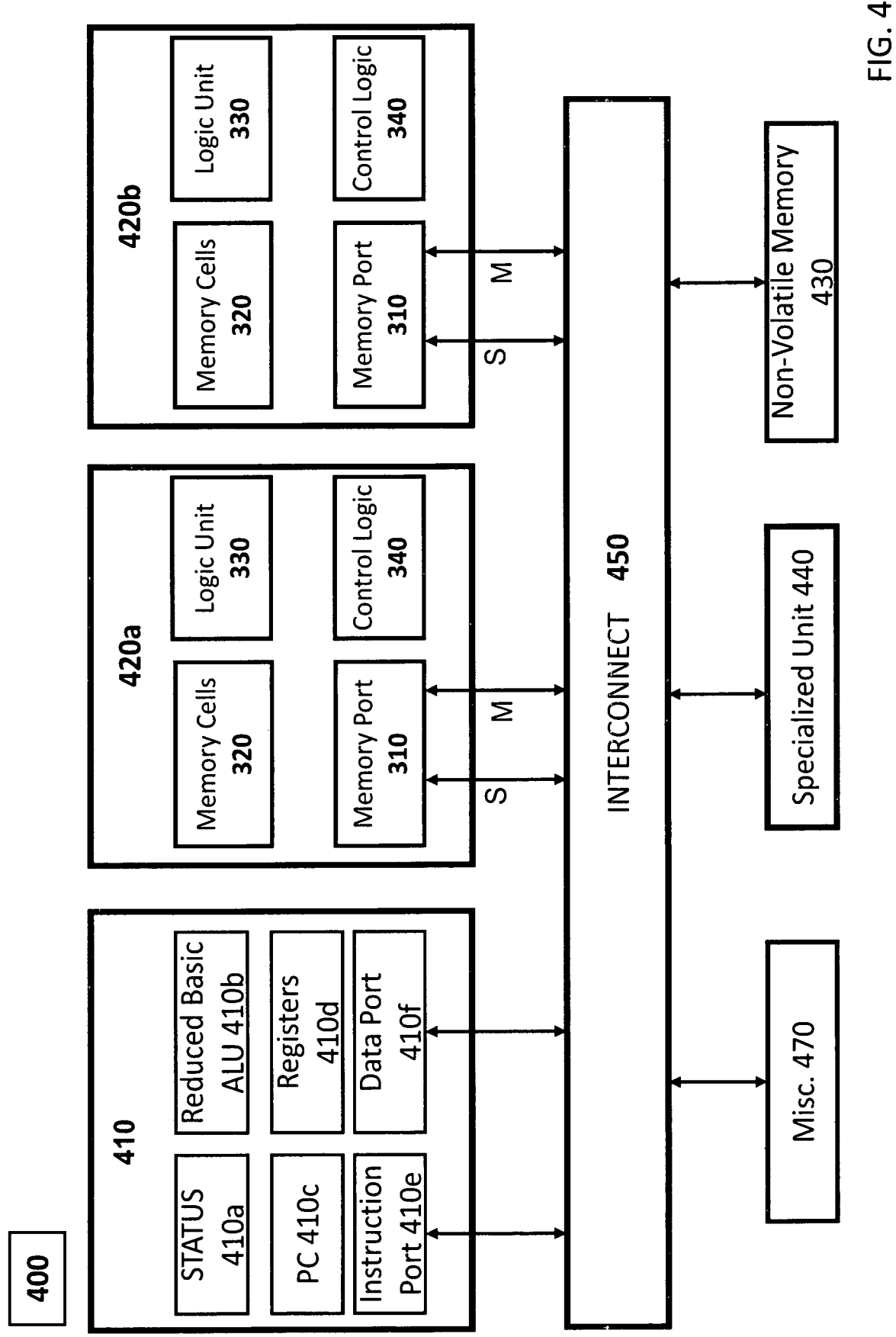
FIG. 4 is a block diagram of an exemplary computer system in accordance with exemplary embodiments of the present disclosure.

FIG. 4 shows a block diagram of an exemplary computer system 400 in accordance with exemplary embodiments of the present disclosure. The system 400 may include a processing unit (e.g., a simplified CPU) 410, memory element or devices 420a and 420b, a non-volatile memory unit 430, and a specialized unit 440. In some examples, the system 400 may further include some other miscellaneous unit 470. These components may be coupled to each other through the interconnect 450. The interconnect 450 may include one or more buses. In other examples, one or more other components or devices may be coupled to the interconnect. Please note that the computer system 400 is exemplary and other implementations can be realized and implemented.

The processing unit 410 may be a simplified or "stripped-down" CPU. In the example of FIG. 4, the processing unit 410 includes a status register 410a, a reduced basic arithmetic logic unit 410b, a program counter 410c, one or more registers 410d, an instruction port 410e, and a data port 410f. As shown, the processing unit 410 may not include a reduced cache or no cache at all in some instances.

The memory devices 420a and 420b may each be a processor-in-memory, e.g., the memory device 300 of FIG. 3, and thus can perform in-device computations. The processing unit 410 can be configured to request and trigger the memory devices 420a and/or 420b to perform in-device computations. In other words, the processing unit 410 can send communications or signals through the interconnect 450 to cause the memory devices 420a and 420b to perform certain operations in-device.

The operations that can be performed by the memory device 420a and 420b include ALU operations as described before, e.g., addition, subtraction, multiplication, division, shifting, rotations, AND, OR, XOR Negation, Dot Products (e.g., Inner, Outer), Vector Reduction, and the like.

Further, the CPU 410 can transmit signals or communications for a memory device (e.g., memory device 420a or 420b) to perform a SIMD related operations. For example, the CPU 410 can send signals regarding the SIMD operations, which include operand addresses (e.g., Operand 1 and Operand 2), operand strides (e.g., Operand 1 Stride and Operand 2 Stride), Result Address, Result Stride, Data Type, Data Length, Operation. Stride and length information can help accomplish vector computations in the memory device 420a or 420b. As the operations or computations are local to the memory device, the speed of these computations can far exceed the computation speed had the data been moved to a CPU and then later back to memory. For the memory device (e.g., memory device 420a or 420b) to perform operations or computations on data located in its memory cells 320 (e.g., processor memory cells), it may require information regarding the input and output operands.

Further, with respect to the memory devices 420a and 420b, the processing unit 410 may send handshake signals for synchronizing or establishing connections. The handshake signals may include busy, ACK, ready, stall, etc., type signals which can be needed for synchronization of the finite state machines of both the processing unit 410 and the memory elements (e.g., 420a or 420b).

As described, memory devices described herein, e.g., the memory device 300 of FIG. 3 may be triggered by a received signal to operate in the first mode, e.g., the mode in which the memory device 300 performs in-device processing. Other mode signals may also be sent, e.g., mode signals (if necessary), to transition the memory device 420a or 420b to a second mode (e.g., when the memory device operates like a traditional memory).

While the memory devices 420a and 420b can perform many or most of the computation operations needed, the processing unit 410 may perform some computations. For example, the processing unit 410 may perform some comparisons, counting, and/or basic ALU operations.

The memory devices 420a and 420b may have a master port and a slave port. In embodiments, instructions from processing unit 410 may be received at the slave port and then acted upon.

In some cases, the memory device 420 (e.g., 420a and/or 420b) may not personally fulfill a request, (e.g., a request to perform instructions received from the processing unit 410). That is, while the memory device may be assigned to satisfying requests, it may delegate the fulfillment of certain request to another device. For example, instructions may request or require a particular operation or computation that is outside of the scope of the capabilities of the logic unit 330 of the memory device 420. Accordingly, in response, the memory device 420 may be configured to access another component or another device.

The transactions or communications between the memory device 420 (e.g., 420a or 420b) and the processing unit 410 may be categorized as processor-in-memory (PIM) communications or legacy communications. The memory device 420 may be configured to realize or detect an instruction or instruction cannot be performed but can be performed by the specialized unit 440. The memory device 420 may communicate and cause or instruct the specialized unit to perform the instruction(s). For example, the memory device 420 may through a master port of the memory port act as a bus master, e.g., temporarily to communicate with the specialized unit 440 acting as a slave to cause the specialized unit to perform certain operations (not able to be performed by the memory device) and to obtain the result of such operations. That is, the memory device 420 can provide instructions and data then obtain the results.

In the example of FIG. 4, the memory device 420 may access the functionality of the specialized unit 440. The specialized unit 440 may be a component that can perform one or more operations or computations that memory device 420 cannot perform. Such operations may include advanced mathematical operations such as, for example, trigonometric functions (e.g., sine, cosine, tangent), exponential functions, logarithm functions, etc.

The interconnect 450 may include one or more buses. Further, the interconnect may be configured or capable of supporting one or more interfaces, e.g., for PIM and legacy memory transactions/communications. For example, the interconnect 450 may support one or more standardized interfaces and support the PIM interface. In some instances, for the system 400, it would be that a pair of master and slave are communicating over a standard protocol (e.g., AXI, Wishbone, or SRI, another pair may be communicating with each other using the PIM interface.

Figure 5:
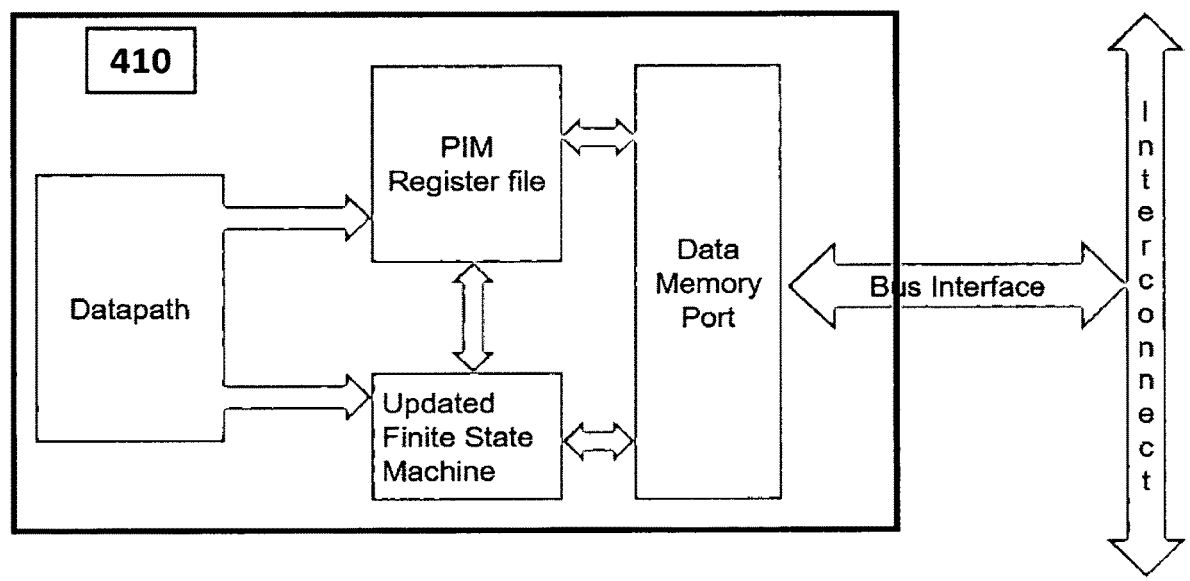
FIG. 5 is a block diagram of a processing unit in accordance with exemplary embodiments of the present disclosure.

FIG. 5 shows another exemplary block diagram representing the processing unit 410. The processing unit 410 (which can be a CPU) can include a special register file, identified herein as a PIM Register file. This PIM Register can include details or information sent over the PIM interface to the memory device 420 (e.g., memory device 420*a* or 420*b*). Software running on the processing unit 410 can update the PIM Register file. The finite state machine logic of the data port 410*f* of the processing unit 410 can be updated to configure and drive the interface with either the standardized interface signals or the PIM interface signals, as the case may be.

In accordance with exemplary embodiments of the present disclosure, the transactions or communications, e.g., between the processing unit 410 and the memory device 420, may be simplified. Rather than the communications specifying the details of input and output operands over the interconnect 450, data tags may be used. In such instances, each operand to be processed by the memory. Device 420 may be qualified by a data tag describing its attributes.

FIG. 6 shows exemplary data tags 600. Such data tags 600 may reside in memory cells 320 of the memory device 420. The memory device 420 may be configured to receive the data tags 600 as operands, and then extracts relevant details about the operands from the tags and performs necessary computations. The use of data tags allows a system the ability to describe multi-dimensional data better. FIG. 7 includes table 700 that shows groups or sets of exemplary data tags. Such data tags can be used for lower dimension data.

Figure 8:
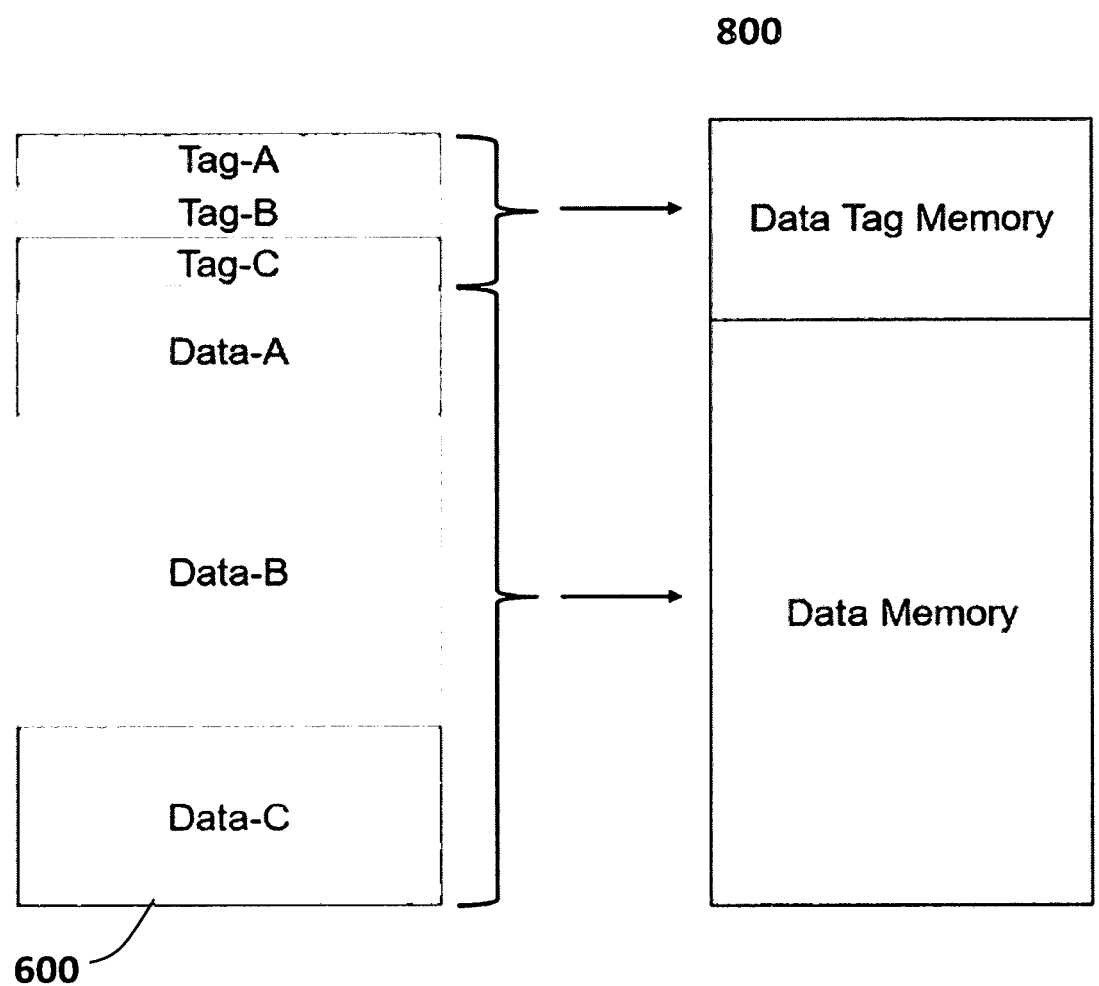
FIG. 8 shows an exemplary placement of data tags in memory cells in accordance with exemplary embodiments of the present disclosure.

FIG. 8 shows an exemplary placement of data tags 600 in memory cells 800. A portion of the regular data memory of the memory cells 800 (e.g., processor memory cells 320*a*) may be assigned or reserved for the storage of data tags 600. Further, the data tags may be created upfront for each data object or, in other instances, may, for example, be constructed only for operands pertinent to a computation about to be scheduled by the CPU.

FIG. 9 shows an illustration representing matrix multiplication using standard Von-Neumann type computer architecture system and processor-in-memory using data tags. More specifically, FIG. 9 shows the multiplication of Matrix A (M by N matrix) and Matrix B (N by P matrix) to produce Matrix C (M by P matrix).

The sample or pseudo code 910 be the type of instructions that may be used for matrix multiplication in a classic Von-Neumann type computer architecture system while pseudo code 920 can be the type of instructions used for PIM architecture using data tags.

As can be seen by the comparison of the pseudo code 910 and the pseudo code 920, the PIM architectures allows for performance enhancement. In general, PIM architecture with the re-distribution of compute elements, can realize speed and performance improvements. The PIM architectures allows for smaller programs/code, e.g., with Fewer load/stores. Further the programs can execute faster, e.g., with asynchronous processing in memories. Further, the CPUs can be smaller, simpler, more cost-effective, and using less energy. Further, the PIM architecture may be cache-less, hence no cache coherency infrastructure.

The following examples pertain to further aspects of the present disclosure:

Example 1 is a system including: a memory device, the memory device including: a plurality of memory cells comprising a plurality of legacy memory cells and a plurality of processor memory cells; a memory port configured to read and/or write data to the plurality of memory cells; a logic unit comprising digital circuitry configured to perform mathematic and logic operations, wherein the logic unit is configured to perform processing operations exclusively with regards to data stored or to be stored in the processor memory cells of the memory device; and a control logic circuitry configured to control operation of the memory device; the system further including: one or more electronic devices; and an interconnect coupling the one or more electronic devices and the memory device to each other.

Example 2 is the subject matter of Example 1, wherein when the memory device operates in a first mode, the memory port of the memory device can be configured to exchange communications with at least one of the one or more electronic devices coupled to the memory device via the interconnect the memory device, wherein the communications involve storage, retrieval, and/or processing of data in the processor memory cells according to the control logic circuitry.

Example 3 is the subject matter of Example 1 or 2, wherein when the memory device operates in a first mode, the control logic circuitry can be configured to cause the logic unit to perform one or more processing operations on data in the processor memory cells.

Example 4 is the subject matter of Example 1 or 2, wherein when the memory device operates in the first mode, the memory port of the memory device, can be configured to directly store or retrieve data with only the legacy memory cells.

Example 5 is the subject matter of any of Examples 1 to 4, wherein the control logic circuitry can be configured to cause the memory device to operate in the first mode.

Example 6 is the subject matter of any of Examples 1 to 5, wherein the memory port can be configured to exchange communications with one of the one or more electronic devices when the memory device operates in a second mode, wherein the communications involve direct storage and retrieval of data from the legacy memory cells.

Example 7 is the subject matter of any of Examples 1 to 5, wherein the memory port can be configured, while the memory device operates in a second mode, to directly store and retrieve data at the legacy memory cells.

Example 8 is the subject matter of Example 6, wherein the memory port can be further configured to directly store and retrieve data at the processor memory cells when the memory device operates in the second mode.

Example 9 is the subject matter of any of Examples 6 to 8, wherein the control logic circuitry can be configured to cause the memory device to operate in the second mode.

Example 10 is the subject matter of any of Examples 2 to 9, wherein the control circuitry can be configured to cause the memory port to exchange communications with the at least one of the one or more electronic devices involving a performance of a processing operation by the other electronic device.

Example 11 is the subject matter of Example 10, wherein the processing operation can be a mathematical or logic operation the logic unit of the memory is not capable of performing.

Example 12 is the subject matter of any of Examples 1 to 11, wherein when the memory device is in the first or second mode, the memory port can be configured to exchange communications with at least one of the one or more electronic devices involve the storage and/or retrieval of data in the legacy memory cells.

Example 13 is the subject matter of any of Examples 6 to 12, wherein the interconnect supports communications involving operation of the memory device in the first mode and the second mode.

Example 14 is the subject matter of any of Examples 2 to 12, wherein the one or more electronic devices can include a processing circuitry, the processing circuitry configured to send operation request communications to the memory device for execution by the memory device.

Example 15 is the subject matter of Example 14, wherein the processing circuitry can be configured to send scalar operation request communications to the memory device.

Example 16 is the subject matter of Example 14 or 15, wherein the processing circuitry is configured to send single instruction/multiple data (SIMD) operation request communications to the memory device.

Example 17 is the subject matter of any of Examples 14 to 16, wherein the processing circuitry can be a central processing unit (CPU).

Example 18 is the subject matter of any of Examples 1 to 17, wherein the interconnect can include one or more buses.

Example 19 is the subject matter of Example 18, wherein the control logic circuitry can be configured to operate the memory device as a bus master to control the interconnect via the memory port.

Example 20 is the subject matter of Example 19, wherein the control logic circuitry is configured to operate the memory device as a bus master to control the interconnect so as to request one or more electronic devices to perform an operation not supported by the logic unit of the memory device.

Example 21 is the subject matter of Example 20, wherein the one of the one or more electronic devices requested to perform an operation not supported by the logic unit of the memory device comprises a math processor.

Example 22 is the subject matter of any of Examples 1 to 21, wherein the logic unit of the memory device comprises an arithmetic logic unit (ALU) device.

Example 1A is a memory device including: a plurality of memory cells for storing data; a memory interface configured to store and retrieve data at the plurality of memory cells; a logic unit comprising digital circuitry configured to perform mathematic and logic operations; and a control circuitry configured to control operation of the memory device.

Example 2A is the subject matter of Example 1A, wherein the plurality of memory cells can include a plurality of legacy memory cells and a plurality of processor memory cells and configured to operate in a first mode and second mode.

Example 3A is the subject matter of Example 2A, wherein the logic unit can be configured to exclusively perform processing operations with regards to data stored or to be stored in the processor memory cells of the memory device.

Example 4A is the subject matter of Example 2A or 3A, wherein when the memory device operates in the first mode, the memory interface can be configured to exchange communications with another electronic device that is coupled to the memory device, wherein the communications involve storage, retrieval, and/or processing of data in the processor memory cells according to the control logic circuitry.

Example 5A is the subject matter of any of Examples 2A to 4A, wherein when the memory device operates in the first mode, the control logic circuitry can be configured to cause the logic unit to perform one or more processing operations on data in the processor memory cells.

Example 6A is the subject matter of any of Examples 2A to 5A, wherein when the memory device operates in the first mode, the memory interface can be configured to directly store or retrieve data with only the legacy memory cells.

Example 7A is the subject matter of any of Examples 2A to 6A, wherein the control logic circuitry can be configured to cause the memory device to operate in the first mode.

Example 8A is the subject matter of Example 7A, wherein the control logic circuitry can be configured to cause the memory device to operate in the first mode in response to a first control signal received at the memory interface.

Example 9A is the subject matter of any of Examples 2A to 8A, wherein when the memory device operates in the second mode, the memory interface is configured to exchange communications with another electronic device coupled to the memory device involving direct storage and retrieval from the legacy memory cells.

Example 10A is the subject matter of any of Examples 2A to 9A, wherein the memory interface is configured, while the memory device operates in the second mode, to directly store and retrieve data only at the processor memory cells.

Example 11A is the subject matter of Example 9A, wherein the memory port can be further configured to directly store and retrieve data at the processor memory cells when the memory device operates in the second mode.

Example 12A is the subject matter of any of Examples 2A to 11A, wherein the control logic circuitry can be configured to cause the memory device to operate in the second mode.

Example 13A is the subject matter of Example 12A, wherein the control logic circuitry can be configured to cause the memory device to operate in the second mode in response to a second control signal received at the memory interface, the second control signal being different from the first control signal.

Example 14A is the subject matter of any of Examples 1A to 13A, wherein the control logic circuitry can be configured to operate the memory device as a bus master to control at least one bus coupled to the memory device via the memory interface.

Example 15A is the subject matter of Example 12A, wherein the control logic circuitry can be configured to operate the memory device as a bus master to control at least one bus coupled to the memory device via the memory interface for exchanging communications involving a performance of an operation not natively supported by the logic unit of the memory device.

Example 16A is the subject matter of any of Examples 1A to 15A, wherein the control logic circuitry can be configured to operate the memory device as slave memory using the legacy memory cells.

Example 17A is the subject matter of any of claims 1A to 16A, wherein the logic unit can be configured to perform scalar and/or single instruction/multiple data (SIMD) operations.

Example 18A is the subject matter of any of Example 1A to 17A, wherein the logic unit comprises an arithmetic logic unit.

It should be noted that one or more of the features of any of the examples above may be combined with any one of the other examples.

The foregoing description has been given by way of example only and it will be appreciated by those skilled in the art that modifications may be made without departing from the broader spirit or scope of the description as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

What is claimed is:

1. A system comprising:
    a memory device, the memory device comprising:
        a plurality of memory cells comprising a plurality of legacy memory cells and a plurality of processor memory cells, the plurality of processor memory cells configured to store first data, the plurality of legacy memory cells configured to store second data, different than the first data;
        a memory port coupled to the plurality of legacy memory cells and the plurality of processor memory cells, the memory port configured to read and/or write the first data to the plurality of processor memory cells and to read and/or write the second data to the legacy memory cells;
        a logic unit coupled to the processor memory cells, the logic unit comprising digital circuitry configured to perform mathematic and logic operations; and
        a control logic circuitry coupled to the memory port and the logic unit, the control logic circuitry configured to control the memory port to access the plurality of processor memory cells and the plurality of legacy memory cells, and the control logic circuitry configured to control the logic unit;
    a processing device;
    a specialized device; and
    an interconnect coupling the memory port of the memory device to the specialized device and the processing device,
    wherein the processing device is configured to provide, to the memory port, first instructions to perform processing operations on the first data stored in the plurality of processor memory cells,
    wherein the memory device is configured to determine if the logic unit can perform the processing operations on the first data,
    wherein in response to the memory device determining that the logic unit can perform the processing operations on the first data, the control logic circuitry is configured to cause the logic unit to perform the processing operations on the first data, and
    wherein in response to the memory device determining that the logic unit cannot perform the processing operations on the first data, the control logic circuitry is configured to command the memory port to provide, to the specialized device, the first data and second instructions to perform the processing operations on the first data.

2. The system of claim 1, wherein the memory device is configured to operate in a first mode in which the memory port of the memory device is configured to exchange communications with the processing device, wherein the communications involve storage, retrieval, and/or the performing of the processing operations on the first data in the plurality of processor memory cells according to the control logic circuitry.

3. The system of claim 1, wherein the memory device is configured to operate in a first mode in which the control logic circuitry is configured to control the logic unit to perform the processing operations exclusively on the first data in the plurality of processor memory cells.

4. The system of claim 3, wherein when the memory device operates in the first mode, the memory port of the memory device is configured to directly store or retrieve the second data with the legacy memory cells.

5. The system of claim 3, wherein the memory device is configured to operate in a second mode in which the memory port is configured to directly store and retrieve the second data at the legacy memory cells.

6. The system of claim 5, wherein the memory port is further configured to directly store and retrieve the first data at the processor memory cells when the memory device operates in the second mode.

7. The system of claim 1, wherein the memory port is configured to exchange communications with the processing device, wherein the communications involve storage and/or retrieval of the second data in the legacy memory cells.

8. The system of claim 1, wherein the control logic circuitry is configured to control the interconnect via the memory port.

9. The system of claim 1, wherein the control logic circuitry is configured to control the interconnect so as to request the specialized device to perform an operation not supported by the logic unit of the memory device.

10. A memory device comprising:
    a plurality of processor memory cells for storing first data;
    a plurality of legacy memory cells for storing second data, different than the first data;
    a memory interface coupled to the plurality of processor memory cells and the plurality of legacy memory cells, the memory interface configured to store and retrieve the first data at the plurality of processor memory cells and the second data at the plurality of legacy memory cells, the memory interface configured to receive first instructions to perform mathematic and logic operations on the first data stored in the plurality of processor memory cells;
    a logic unit coupled to the plurality of processor memory cells, the logic unit comprising digital circuitry configured to perform the mathematic and logic operations on the first data stored in the plurality of processor memory cells; and a control circuitry coupled to the memory interface and the logic unit, the control circuitry configured to control the memory interface to store and retrieve the first data and the second data, control the logic unit, and determine if the logic unit can perform the mathematic and logic operations on the first data, wherein in response to the control circuitry determining that the logic unit can perform the mathematic and logic operations on the first data, the control circuitry is configured to cause the logic unit to perform the mathematic and logic operations on the first data, and wherein in response to the control circuitry determining that the logic unit cannot perform the mathematic and logic operations on the first data, the control circuitry is configured to command the memory interface to output the first data and second instructions to perform the mathematic and logic operations on the first data.

11. The memory device of claim 10, wherein the memory device is configured to operate in a first mode and a second mode, wherein the logic unit is configured to perform the mathematic and logic operations on the first data when the memory device operates in the first mode, and wherein the logic unit is configured to stop performing the mathematic and logic operations on the first data when the memory device operates in the second mode.

12. The memory device of claim 11, wherein when the memory device operates in the second mode, the memory interface is configured to directly store or retrieve only the second data with only the legacy memory cells.

13. The memory device of claim 10, wherein the logic unit is configured to perform the mathematic and logic operations only on the first data.

14. The memory device of claim 10, wherein the second data is not for processing by the logic unit.

15. The memory device of claim 10, wherein the memory interface is adapted to be coupled to a specialized device, and wherein the control circuitry is configured to command the memory interface to output the first data and the second instructions such that the specialized device receives the first data and the second instructions.

16. The memory device of claim 15, wherein the specialized device is configured to perform the mathematic and logic operations on the first data in response to receiving the first data and the second instructions, and wherein the specialized device is configured to provide, to the memory interface, third data indicating a result from performing the mathematic and logic operations on the first data.

17. The memory device of claim 16, wherein the memory interface is configured to store the third data in the plurality of processor memory cells.

18. The system of claim 1, wherein the specialized device is configured to perform the processing operations on the first data in response to receiving the first data and the second instructions to perform the processing operations on the first data, and wherein the specialized device is configured to provide, to the memory port, third data indicating a result from performing the processing operations on the first data.

19. The system of claim 18, wherein the memory port is configured to store the third data in the plurality of processor memory cells.

* * * * *